(12) United States Patent
Song et al.

(10) Patent No.: US 10,560,484 B2
(45) Date of Patent: *Feb. 11, 2020

(54) MANAGING ACCESS IN ONE OR MORE COMPUTING SYSTEMS

(71) Applicant: INTERNATIONAL BUSINESS MACHINES CORPORATION, Armonk, NY (US)

(72) Inventors: Chenfei Song, Markham (CA); Kyle Robeson, North York (CA); Yuan Wang, Hacienda Heights, CA (US); Alex Luc, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,703

(22) Filed: Aug. 2, 2018

(65) Prior Publication Data

US 2018/0343285 A1 Nov. 29, 2018

Related U.S. Application Data

(63) Continuation of application No. 15/190,795, filed on Jun. 23, 2016, now Pat. No. 10,079,858, which is a
(Continued)

(51) Int. Cl.
*G06F 17/00* (2019.01)
*H04L 29/06* (2006.01)
(Continued)

(52) U.S. Cl.
CPC ............ *H04L 63/20* (2013.01); *G06F 16/288* (2019.01); *G06F 16/951* (2019.01);
(Continued)

(58) Field of Classification Search
None
See application file for complete search history.

(56) References Cited

U.S. PATENT DOCUMENTS 8,131,524 B2 * 3/2012 Bushey ..................... G06F 8/20
 379/88.18
8,214,398 B1 * 7/2012 Cowan ................ G06F 21/6218
 707/785

(Continued)

OTHER PUBLICATIONS

Centonze, Paolina et al. Role-Based Access Control Consistency Validation. ISSTA '06 Proceedings of the 2006 International symposium on Software testing and analysis, Portland, Maine, Jul. 17-20, 2006, pp. 121-132. ACM: New York City, NY.

*Primary Examiner* — Gary S Gracia
(74) *Attorney, Agent, or Firm* — The Steadman Law Firm PLLC

(57) ABSTRACT

Embodiments pertaining to managing access in one or more computing systems can include an operations controller in communication with the one or more computing systems for managing commercial transactions of the one or more computing systems and an access management controller in communication with the operations controller. The access management controller can receive an input that identifies relationships between user roles and actions associated with the one or more computing systems. The access management controller can provide the input to the operations controller for implementation of access rules in accordance with the relationships. The access management controller can attempt to access in the one or more computing systems at least a portion of the user roles and the actions after the operations controller has implemented the access rules. The access management controller can compare the attempted access with the relationships to determine access discrepancies.

17 Claims, 2 Drawing Sheets

Related U.S. Application Data continuation of application No. 12/023,650, filed on Jan. 31, 2008, now Pat. No. 9,430,660.

(51) Int. Cl.
    *G06F 16/28*     (2019.01)
    *G06F 16/951*     (2019.01)
    *G06F 21/62*     (2013.01)
    *G06F 21/60*     (2013.01)

(52) U.S. Cl.
    CPC ........ *G06F 21/604* (2013.01); *G06F 21/6218* (2013.01); *H04L 63/102* (2013.01)

(56) References Cited

U.S. PATENT DOCUMENTS

| | | | |
|---|---|---|---|
| 2003/0074580 A1* | 4/2003 | Knouse | H04L 63/0815 726/4 |
| 2003/0084069 A1* | 5/2003 | Boreham | G06F 21/6227 |
| 2005/0110806 A1 | 5/2005 | Stobie et al. | |
| 2005/0131830 A1 | 6/2005 | Juarez et al. | |
| 2005/0172151 A1* | 8/2005 | Kodimer | G06F 21/31 726/5 |
| 2006/0010483 A1* | 1/2006 | Buehler | G06F 21/6227 726/1 |
| 2006/0048224 A1* | 3/2006 | Duncan | G06F 21/10 726/22 |
| 2006/0059253 A1* | 3/2006 | Goodman | G06Q 10/10 709/223 |
| 2006/0059567 A1* | 3/2006 | Bird | G06F 12/1466 726/27 |
| 2006/0090208 A1* | 4/2006 | Smith | G06F 21/604 726/26 |
| 2007/0006041 A1* | 1/2007 | Brunswig | G06F 11/3688 714/38.14 |
| 2007/0094198 A1* | 4/2007 | Loh | G06N 5/04 706/47 |
| 2007/0113187 A1* | 5/2007 | McMullen | G06F 21/6218 715/742 |
| 2007/0162456 A1* | 7/2007 | Agassi | G06F 16/9535 |
| 2007/0174899 A1* | 7/2007 | Broberg | G06F 21/6218 726/4 |
| 2007/0240203 A1 | 10/2007 | Beck | |
| 2007/0283443 A1* | 12/2007 | McPherson | G06F 21/6218 726/26 |
| 2008/0104244 A1* | 5/2008 | Chen | H04L 67/16 709/226 |
| 2008/0163335 A1* | 7/2008 | Hagstrom | G06F 21/6218 726/1 |
| 2008/0172720 A1* | 7/2008 | Botz | G06F 21/604 726/3 |
| 2008/0228671 A1* | 9/2008 | Nagaraj | G06Q 10/10 705/500 |
| 2008/0235811 A1* | 9/2008 | Yan | G02F 21/6218 726/29 |
| 2009/0006987 A1* | 1/2009 | Simhi | G06F 8/24 715/762 |
| 2009/0025063 A1* | 1/2009 | Thomas | G06F 21/6218 726/4 |
| 2009/0089291 A1* | 4/2009 | Daily | G06F 21/6218 |
| 2009/0106271 A1* | 4/2009 | Chieu | G06F 16/33 |
| 2009/0178102 A1* | 7/2009 | Alghathbar | G06F 21/6218 726/1 |
| 2009/0193096 A1* | 7/2009 | Boyer | G06F 16/958 709/217 |

\* cited by examiner

MANAGING ACCESS IN ONE OR MORE COMPUTING SYSTEMS

FIELD OF THE INVENTION

The invention relates to computing systems, and more particularly, to managing user access associated with the computing systems.

BACKGROUND

Numerous entities including individuals and organizations utilize computing systems to conduct various transactions, such as transactions conducted over the Internet. These transactions can include commercial Internet transactions, which have been termed e-commerce transactions. Commercial transactions can include dealing directly with consumers, dealing directly with other organizations, and dealing indirectly with entities through channel partners. Managing the transactions can be a complicated and time-consuming effort. To facilitate the management of these transactions, unified software platforms have been developed that can be utilized by the organizations for implementation and management of commercial websites and the like.

The software platforms can control access to various features or aspects of the computing system, such as allowing management personnel to access administrative functions or allowing customers to access purchasing functions. For large scale systems that have a number of different types of users there can be a number of different types of access. As the scale grows and new types of users and roles are added to the system, management of the access can become increasingly more cumbersome.

The management of the access can include providing a text paragraph to elaborate a user-role relationship, which is reviewed and approved. A document team can then be provided with the text paragraph for transformation into a spreadsheet, which can result in the introduction of errors. These errors can cause the spreadsheet and the intended access to be out of sync.

The management of the access can also include testing of the access, whereby a tester logs in with each user, into each store, to verify each menu or action that is accessible. This can be a long, tedious and error prone process.

A need exists for a method and system of managing access in a computing system that allows for efficient design and testing of the access being provided. A need further exists for a method and system of managing access in a computing system that provides flexibility to developers in implementing the access control. A need yet further exists for a method and system of managing access in a computing system that makes testing results readily available.

SUMMARY

One embodiment is a method and system for designing and/or testing role-based access to a computing system. Exemplary embodiments can provide for efficient design and testing of the access being provided to the computing system. The system can manage access in the computing system to provide flexibility to developers in implementing the access control. The system also can manage access in the computing system to make testing results readily available.

In one exemplary embodiment, there is provided a method of managing access in a computing system. The method can include receiving an input with user roles and actions that are associated with the computing system; generating a matrix indicating a relationship between the user roles and the actions; presenting the matrix to a reviewer for approval of the relationship between the user roles and the actions; providing the input to an operations controller for implementation of access rules in accordance with the relationship indicated in the matrix when the approval is received; attempting to access in the computing system at least a portion of the user roles and actions after the operations controller has implemented the access rules; comparing the attempted access with the relationship indicated in the matrix; and presenting access discrepancies between the attempted access and the relationship indicated in the matrix.

In another exemplary embodiment, there is provided a system for management of commercial transactions of a computing system over the Internet. The system can include an operations controller in communication with the computing system for managing commercial transactions of the computing system over the Internet, and an access management controller in communication with the operations controller. The access management controller can receive an input with user roles and actions that are associated with the computing system. The access management controller can generate a matrix indicating a relationship between the user roles and the actions. The access management controller can provide the input to the operations controller for implementation of access rules in accordance with the relationship indicated in the matrix. The access management controller can attempt to access in the computing system at least a portion of the user roles and actions after the operations controller has implemented the access rules. The access management controller can compare the attempted access with the relationship indicated in the matrix to determine access discrepancies.

In another exemplary embodiment, there is provided a computer-readable storage medium in which computer-executable code is stored. The computer-executable code can be configured to cause a computing device in which the computer-readable storage medium is loaded to execute the following steps: receiving an input having user roles and actions associated with the computing system; generating a matrix indicating a relationship between the user roles and the actions; presenting the matrix to a reviewer; receiving approval for the relationship between the user roles and the actions from the reviewer; providing the input to an operations controller for implementation of access rules in accordance with the relationship indicated in the matrix; attempting to access in the computing system at least a portion of the user roles and actions after the operations controller has implemented the access rules; comparing the attempted access with the relationship indicated in the matrix; presenting access discrepancies between the attempted access and the relationship indicated in the matrix in a test report; and providing the test report to a webpage for posting thereon.

BRIEF DESCRIPTION OF THE DRAWINGS

Exemplary embodiments of the user access method and system will now be described, by way of example only, with reference to the accompanying drawings, in which.

DETAILED DESCRIPTION

The present disclosure provides various exemplary embodiments of methods and systems directed to managing access in a computing system. The methods and systems can assist in the design of role-based access configurations to be implemented in one or more computing systems, as well as the testing of the access provided by the one or more computing systems. Exemplary embodiments will be explained in connection with various possible computing methods and systems that are associated with e-commerce activities. It should be understood by one of ordinary skill in the art that the features and methodologies described with respect to the exemplary embodiments can be utilized with other types of computing systems that engage in various types of transactions, whether commercial or not. The detailed description is intended only to be exemplary. Exemplary embodiments are shown in FIGS. 1 and 2, but the present disclosure is not limited to the illustrated structure or application.

Figure 1:
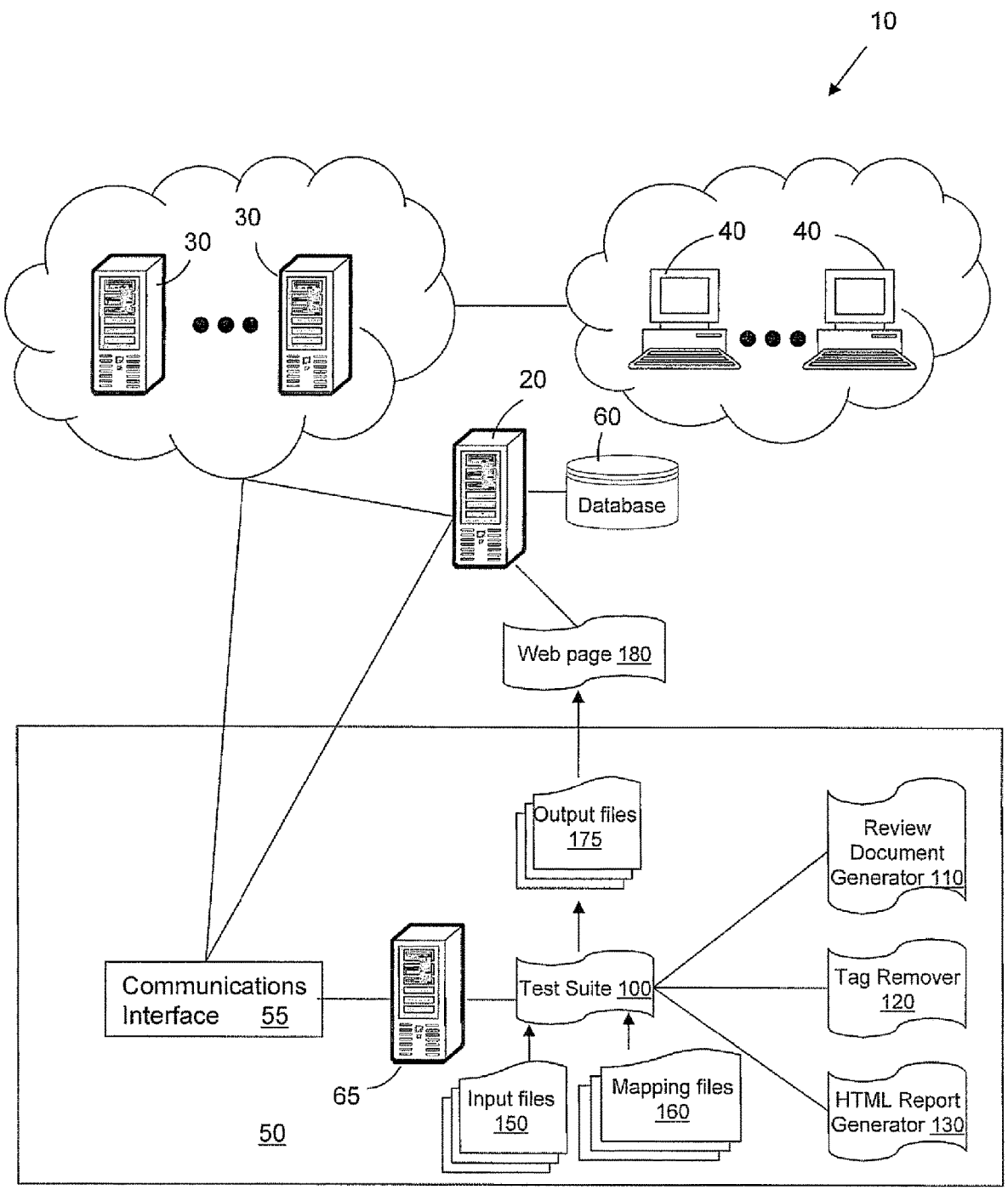
FIG. 1 is a schematic representation of a system according to an exemplary embodiment of the invention.
Figure 2:
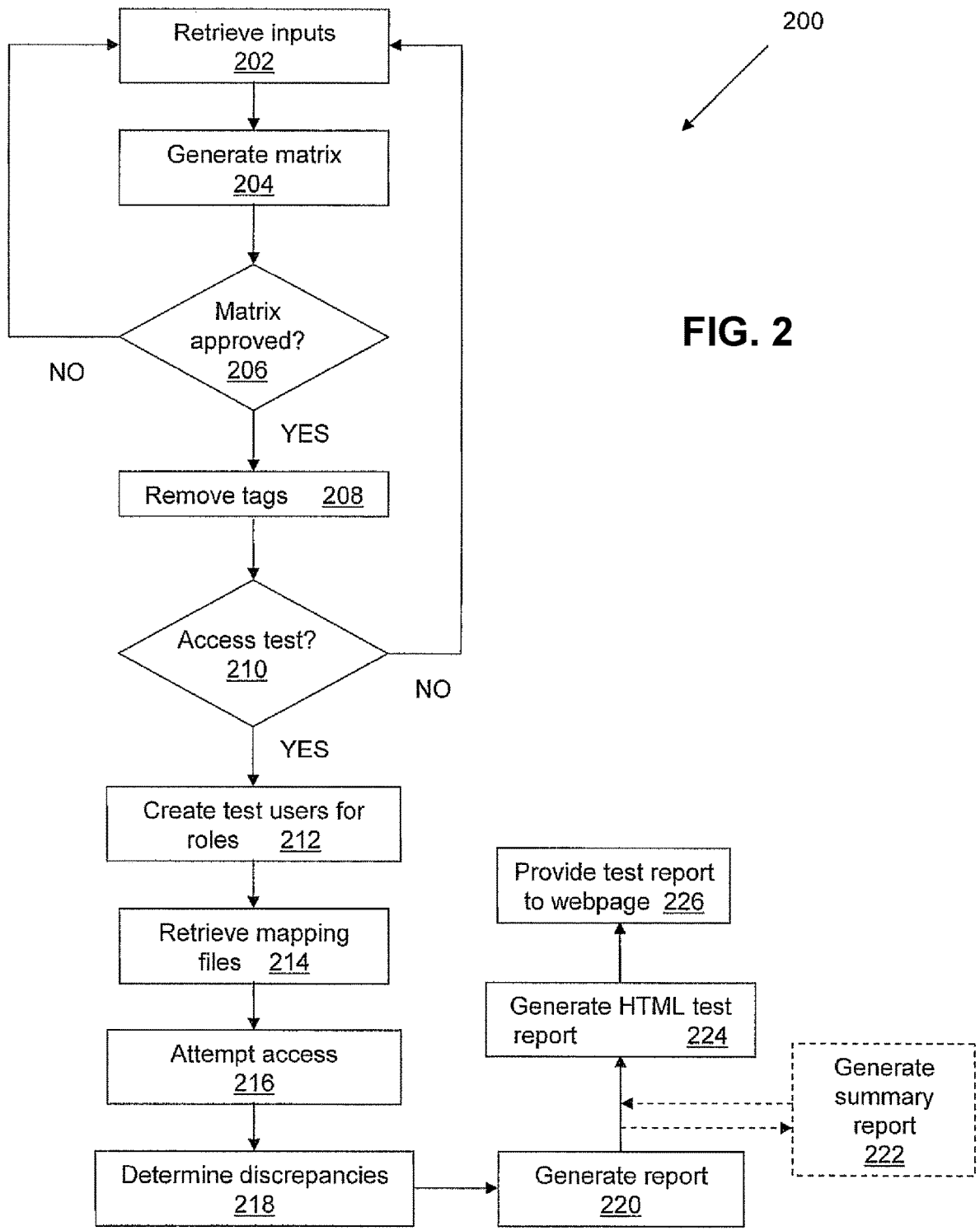
FIG. 2 is a flow chart illustrating a method of managing user access utilizing the system of FIG. 1.

Referring to FIG. 1, an exemplary embodiment of a system according to aspects of the invention, is shown and generally represented by reference numeral 10. The system 10 can include a control platform or server 20 that is in communication with one or more computing systems 30. The control platform 20 can comprise hardware and software that provides for implementation and management of commercial websites and the like, such as an operations controller. In one embodiment, the control platform 20 includes a memory 60 (such as a high capacity storage medium) embodied in this illustration as a database. The computing systems 30 can be various entities, whether related or unrelated, that utilize the control platform 20 for management of computing activities, including commercial transactions.

The computing systems 30 can communicate with one or more customers, such as through the use of customer computers 40, to perform the commercial transactions with those customers. The customers can be various entities including individuals, organizations, and/or channel partners. In one embodiment, one or more of the customers can also be a computing system 30 that utilizes the control platform 20.

Various configurations for the control platform 20, the computing systems 30 and the customer computers 40 are contemplated by the present disclosure, including a de-centralized control platform that utilizes a plurality of sub-platforms, such as running on one or more of the computing systems 30. In one embodiment, the control platform 20 can be a WebSphere® application server from IBM®. The control platform 20 can include such features as an online store and a fully integrated, multi-channel sales network.

The system 10 can include an access management subsystem or controller 50. The access management controller 50 can be incorporated into the control platform 20 or can be a separate device that is in communication with the control platform. In one embodiment, the access management controller 50 is in communication with both of the control platform 20 and the one or more computing systems 30. This configuration provides for a reduction of traffic and processing by the control platform 20 with respect to design and testing of the access implementation which is performed by the access management controller 50, as described more particularly below.

The access management controller 50 can include a communications interface 55 that utilizes common technology for communicating with the control platform 20 and one or more of the computing systems 30, such as over a network including the Internet. The access management controller 50 can further include a server 65 that makes use of computing technology, such as a desktop computer or scalable server, for controlling operations of the access management controller. The access management controller 50 can have an access tool or software 100 capable of retrieving or otherwise receiving input files 150 and capable of generating and transmitting output files 175, such as through the use of a review document generator 110, a tag remover 120, and/or a HTML report generator 130, as described more particularly below. In one embodiment, the input files 150 can be user role matrix input files, such as text-based files that define or otherwise describe the menu-role relationship. In another embodiment, the access tool 100 can be a user role matrix test suite that dynamically creates test users for each user role based on information in the database 60, loops through all the test users in one or more specified computing systems (e.g., by logging in to an administrative tool (not shown) of the control platform 20), and verifies menu items against the role matrix input files 150. In another embodiment, the access tool 100 can report discrepancies for developer provided roles, as well as those roles existing in the database 60 but not on a developer list.

In another embodiment, the access tool 100 can generate HTML documents from the role matrix input files 150 with highlights or other indicia of additions and deletions to the data, as well as comments. In yet another embodiment, the access tool 100 can generate or provide HTML test reports that highlight errors and warnings associated with access in the computing systems 30, and can link all the reports by store and tool types. In still another embodiment, the access tool 100 can update a report webpage or website 180 with the output files 175, such as the HTML test reports.

Referring additionally to FIG. 2, the system 10 can utilize an access management method or process 200 to assist in the design of role-based access controls and/or to test those controls. In the exemplary embodiment, the method 200 is described as being performed by the access management controller 50. The present disclosure, however, contemplates other devices or systems performing the method, including the server 20, the computing systems 30 or another entity. The present disclosure is not intended to be limited by the device or system carrying out the method 200. It would be apparent to one of ordinary skill in the art that other embodiments not depicted in FIG. 2 are possible without departing from the scope of the claims described below, including examination of other portions of the body. For example, possible variants to method 200 are shown in broken lines.

The method 200 can begin with step 202 in which the input files 150 associated with the user roles are retrieved by the access management controller 20. The input files 150 (e.g., user role matrix inputs) can be text-based files that are readable by the access management controller 100. In one embodiment, the text-based files can describe the menu-role relationship to be implemented by one or more of the computing systems 20 through use of a standardized text paragraph which is more easily utilized by developers implementing the access control functions. For instance, the input files can include standardized text as follows:

Find Customers=Customer Service Representative, Seller (1)

Catalog Management=Marketing Manager, Product Manager, Seller (2)

The above standardized text lines (1) and (2) indicate that the user roles of "Customer Service Representative" and "Seller" are allowed to access the "Find Customers" menu, whereas "Marketing Manager," "Product Manager" and "Seller" are allowed to access the "Catalog Management"

menu. These standardized text lines also indicate that no roles other than "Customer Service Representative" or "Seller" are allowed to access the "Find Customers" menu, and no roles other than "Marketing Manager," "Product Manager" or "Seller" are allowed to access the "Catalog Management" menu. It should be further understood that a menu can include one or more performable actions, and access to the menu can include access to performing the actions of the menu or performing only a portion of the actions.

In step 204, the access management controller 50 can generate a matrix representative of the user role relationships, such as in Table 1:

TABLE 1

| Menu/Action | Customer Service Representative | Seller | Marketing Manager | Product Manager |
|---|---|---|---|---|
| Find Customers | Y | Y | N | N |
| Catalog Management | N | Y | Y | Y |

The actual matrix generated can include any number and configuration of menu/actions and users. The table-based user role matrix is more straightforward and facilitates review by managers, developers and the like, as compared to the text lines (1) and (2).

In one embodiment, developers can tag, or otherwise provide indicia, to the user role matrix input files 150 with changes they would like to propose to business architects or other management personnel. As described with respect to step 204 above, the tagged input files 150 can be transformed into a visually more appealing HTML format before sending them to the business architects for review. For instance, the review document generator 110 can convert text-based entries of the input files 150 into table entries and highlight the cells with certain colors or other indicia according to the tags in the input files for ease of reviewing.

As an example, the following lines can be provided in the input files 150:

Accounts=Account Representative[++], Sales
  Manager, Seller  (3)

RFQs=Category Manager, Sales Manager, Seller  (4)

Personalized Attributes[--]=Category Manager,
  Sales Manager, Seller  (5)

The resulting user role matrix that would be generated is shown in Table 2:

TABLE 2

| Menu/Action | Account Representative | Category Manager | Sales Manager | Seller |
|---|---|---|---|---|
| Accounts | Y | N | Y | Y |
| RFQs | N | Y | Y | Y |
| Personalized Attributes | N | Y | Y | Y |

In this example, the developer proposes the addition of the account representative role to the accounts menu and the removal of the personalized attributes menu. The table entry italicization scheme as provided in Table 2 allows the reviewer to see the menu that is to be removed, as well as the users that previously had access to that menu. In one embodiment, the developers can additionally use the tag of [v] to represent "viewable only" and [#comment] for insertion of a comment. The "to be added" and "to be removed" tags can be applied to a specific role-menu relationship or a whole menu, as shown in the example above. The "viewable only" tag can define user actions in a more fine-grained manner. For instance, both the product manager and the account representative can access the "Catalog Management" menu. However, the account representative can only view the catalog tree and related information, whereas the product manager can actually manage or otherwise adjust the catalog by adding or removing categories. The comments tag can be used to add information to menus that the developer would like to communicate to the reviewers.

In step 206, the method 200 can determine if there has been approval of the proposed user role relationships as described in the user role matrix, such as one or both of the matrices of Tables 1 and 2. If there has not been approval, then the developers or other individuals that generated the proposed user role relationships or applied the tags thereto can be advised so that adjustments or corrections can be made. If approval has been provided, then in step 208 the tags can be removed from the standardized text lines of the input files 150 by the tag remover 120, which will facilitate further processing. Through use of the tag remover 120, the user role matrix input files 150 can be used directly by the access tool 100 to do testing, as described more particularly below.

For example, the tag remover 120 can remove the tags of the following text lines in an input file 150:

Accounts=Account Representative[++], Sales
  Manager, Seller[v]  (6)

RFQs=Category Manager[--], Sales Manager,
  Seller[v]  (7)

Personalized Attributes[--]=Category Manager,
  Sales Manager, Seller[v]  (8)

which results in the following text lines:

Accounts=Account Representative, Sales Manager,
  Seller  (9)

RFQs=Sales Manager, Seller  (10)

As can be seen in text line (8), the entire "Personalized Attributes" menu is to be removed so the tag remover 120 removes the entire text line from the input file.

In another embodiment, the tags to be removed, [++], [--], [v] and [#comment], can be defined as final global variables, as typically done, for example, in an object-oriented programming environment. Different values can be assigned to the tags and the tag remover 120 can then be used to remove the newly defined symbols from any text file. The tag remover 120 can generate a backup file for the original input files 150 before removing the tags. This allows a modified version of the utility to be tested without risk.

In step 210, the method 200 can determine whether an access test is to be run on one or more of the computing systems or a portion thereof. The access test can be run based on a number of different factors, such as pursuant to a schedule or as a result of a change to coding utilized by the control platform 20, whether or not the coding is directed to the access control implementation. For example, an update to a code used by the control platform 20 that implements a particular action of a menu may cause a test to be run to determine whether the code has affected the access control associated with that action or menu. If the access test is not to be run, then method 200 can return to step 202 for retrieval of any new input files 150.

If the access test is to be run, then method 200 can proceed to step 212 where the access tool 100 can create a test user for every role that is to be tested. A mapping file 160 can be retrieved in step 214 which specifies the computing systems 30 that are to be tested, such as based upon a store type. The mapping file 160 can be generated based on a number of factors, including the reason the test is being run, changes to coding or changes to the computing systems 30, including the removal or addition of computing systems. In step 216, the access tool 100 can attempt to access the various menus or actions through each user role of the designated computing systems 30. In one embodiment, the access tool 100 can attempt to obtain access for every menu listed in the input file 150 for a specific store type.

In one embodiment, the access tool 100 can create a test user for each role found in a role table stored in the database 60. For example, an array can be used to hold all users created. The access tool 100 can then read in the mapping file 160, which can describe which user role matrix input file 150 corresponds to which store type in the database 60. If a store type or user role matrix input file 150 is not listed or is commented out in the mapping file 160, then it can be excluded from the access test.

The access tool 100 can access the database 60 to retrieve various information for performing the test, such as store identity, fulfilment center identity and/or store owner identity for each store type listed in the mapping file 160, which can later be used during verification. If any information cannot be found in the database 60, then an indication of the absence of the information can be provided in the report summary text file, as described more particularly below. If all information is successfully found for a store type, the access tool 100 can log into that store type with each user role and check all menus that are listed in the user role matrix input file 150 for that store type. The access tool 100 can test along menu paths, i.e., first testing the top menu and then the sub-menu associated with that top menu. By verifying that the correct top menu exists prior to testing the sub-menus, the access tool 100 can eliminate erroneous results when sub-menus with the same name but under different top menus exist.

In step 218, any inconsistencies between the access described in the input files and the actual access of the user role can be determined, and in step 220 the inconsistencies can be provided in a text report file. For example, access test 100 can create a text report file for each store type that is tested and in which any discrepancy with the user role matrix input files 150 is determined. For instance, if a user role is able to access a menu which one of the user role matrix input files 150 indicates as being inaccessible, an error message can be entered in the text report file. The text report file can include other data, such as the date and time of testing and/or generation of the report. In one embodiment, a report summary file can be created in step 220. The report summary can be generated at various times, including upon the completion of the access test. The report summary can provide information about each store type tested, the corresponding user role matrix input file name, the text report file name, whether the test for this store type is run successfully or not, the directory for the user role matrix input files and the date and time the access test was run.

In step 224, the output file 175 such as an HTML test report file or other format of report can be generated by the HTML report generator 130 based on the text report file generated in step 222 to facilitate review of the testing results. The HTML report generator 130 can create the HTML test report file 175 for each user role matrix input file 150 that was tested and which shows in table format the user roles that are intended to access which menus, as well as the results of the access test (i.e., the actual user role behavior). Inconsistencies with the user role matrix input file 150 can be highlighted to facilitate review as in Table 3:

TABLE 3

| Menu/Action | Category Manager | Seller | Customer Service Supervisor |
|---|---|---|---|
| Return Reasons | Y | Y | Y |
| Inventory Adjustment Code | Y | Y | N |

In the example of Table 3, the "Customer Service Supervisor" role is able to access the "Return Reasons" menu even though access was intended to be denied. The table entry can be italicized or otherwise indicated as a discrepancy with respect to the user role matrix input file 150. The exemplary HTML test report file 175 of Table 3 also shows that the remaining role-menu relationships are in accord with the user role matrix input file 150; e.g., the "Seller" user role can access the "Return Reasons" and "Inventory Adjustment Code" menus as intended.

In one embodiment, the HTML report generator 130 can generate the HTML test report file 175 based on the report summary file generated in step 222, such as using object-oriented programming where a HTMLReporter class extracts the name of each user role matrix input file 150 and its equivalent text report file from the latest report summary file. The user role matrix input file 150 can then be passed to the constructor of the RoleMatrix class to invoke a createHashMap( ) method of the latter class which reads the user role matrix input file line by line. A TreeSet can be used to store all roles and menus that are found into a HashMap using the menus as the keys and the user roles that are intended to access the menus as the objects mapped to the keys. The RoleMatrix class can be implemented to facilitate retrieval of menus and user roles that are later needed by the HTMLReporter class during processing. The HTMLReporter class can retrieve all menus, top menus and menu paths found in the text report file and store the menu information in arrays. Each menu can be paired with all of the user roles, and a determination can be made as to whether that pair exists in the user role matrix input file 150 and in the text report file so that inconsistencies are found and written to the HTML test report file 175.

For example, if a role-menu pair exists in the user role matrix input file 150 but not in the text report file, then this role-menu relation did not cause a warning message and is verified to be correct. On the other hand, if a role-menu pair exists in the user role matrix input file 150, as well as in the text report file, it means that this role caused a warning message in the report file because it either is able to access a menu it should not have been able to access or it is not able to access a menu it should have been able to access.

In another embodiment, the HTML report generator 130 can provide for a baseline comparison function. If the comparison function is enabled, new user roles in an input file 150 for which no definitions are known can be tagged with a warning color in the HTML test report file 175 to facilitate review. Once role-menu relationships have been defined for these new roles, the baseline comparison can be enabled upon which these roles will be treated just as any other roles.

In another embodiment, the HTML report generator 130 can be utilized to compare different value types. In the exemplary embodiment, the HTML test report file 175 provides a comparison of roles and menus, but the present disclosure allows for generation of a comparison table of other value types. For instance, an input file 150 that complies with the format expected by the HTML report generator 130 will similarly generate the HTML test report file 175 for these other value types.

In step 226, the webpage 180 can be utilized for providing access to the output files 175 (e.g., the HTML test report files) and the test result data contained therein. In one embodiment, the webpage 180 can link together the results of all access tests run for system 10 to facilitate retrieval of data, such as when a specific test run was performed, the build level used, the overall status of the test, and the number of store types that failed or passed. More detailed information about a test run can be stored in a report summary page, which gives an overview of which store types are tested, enlists the pass/fail status of the individual store types tested and has links to their input and report files. The webpage 180 can link to the report summary and arrange them according to timestamps or the like.

In one embodiment, each time a HTML test report file is generated for each user role matrix input file 150, a new entry can be made into the report summary of the current access test run. Once a report summary page is complete, a link to the report summary and relevant status information can be added to the webpage 180.

In another embodiment, the webpage 180 can utilize object-oriented programming where a constructor of a HistoryWebsiteBuilder class can take the report summary file, which can be one of the output files 175 of the access tool 100, as an input parameter. A call to the generateSummaryPage( ) method of this class can read in the name of each user role matrix input file 150 and its corresponding text report file. For each user role matrix input file 150, the access tool 100 can determine whether the access test resulted in a successful result. For a successful result, the generateSummaryPage( ) can determine the status which can be one of "Pass", "Pass with Warnings" or "Fail." After enough information has been collected for each user role matrix input file 150, an entry into the HTML report summary can be made listing the user role matrix input file name, the store type associated therewith, the status, and the HTML test report file 175 which details the results for that user role matrix file.

In one embodiment, the HTML report summary page can be divided into the user role matrix input files/store types for which the access test had successful results and those for which there was not successful results, as well as an indication of the reasons for the unsuccessful results.

The present disclosure provides a method and system to effectively and efficiently design and test any type of role-based access control implementation. In one embodiment, the access tool 100 can be utilized by the computing systems 30 to validate their own role-based access control mechanisms, such as customized code that they have developed for internal access within their organization.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product. The computer program product can comprise a computer-readable storage medium in which is embedded a computer program comprising computer-executable code for directing a computing device or computer-based system to perform the various procedures, processes and methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

What is claimed is:

1. A method of managing access in one or more computing systems, the method comprising:
providing, by an access management device, an input including relationships between computing system actions and associated user roles to a control server for implementation of access rules in accordance with the relationships;
upon implementation of the access rules, running an access test to determine any access discrepancy between an attempted access and the relationships in the input, wherein determining any access discrepancy comprises dynamically creating respective test users for each of the user roles to be tested based upon database information and identifying any inconsistencies between test user accessibility of the computing system actions and the relationships in the input via an administrative tool of the control server; and
presenting in a test report any access discrepancy between the attempted access and the relationships in the input.

2. The method of claim 1, further comprising generating a matrix representing the relationships in the input.

3. The method of claim 1, wherein running the access test comprises retrieving a mapping file associated with the input, and wherein the mapping file specifies which of the one or more computing systems are to be tested.

4. The method of claim 1, wherein the input includes one or more tags that respectively identify any computing system action or user role to be modified.

5. The method of claim 4, wherein the one or more tags are removed from the input prior to providing the input to the control server.

6. The method of claim 1, wherein the input comprises a standardized text listing of the computing system actions and the associated user roles.

7. The method of claim 1, wherein running the access test comprises testing along menu paths associated with the computing system actions.

8. A system comprising:
a control server in communication with one or more computing systems for managing actions thereof, wherein the control server comprises a memory, and wherein the control server is configured to implement access rules; and an access management device in communication with the control server, wherein the access management device is configured to:

provide an input including relationships between the actions and associated user roles to the control server for implementation of the access rules in accordance with the relationships;

run an access test to determine any access discrepancy between an attempted access and the relationships in the input, wherein determining any access discrepancy comprises dynamically creating respective test users for each of the user roles to be tested based upon database information and identifying any inconsistencies between test user accessibility of the actions and the relationships in the input via an administrative tool of the control server; and present in a test report any access discrepancy between the attempted access and the relationships in the input.

9. The system of claim 8, wherein the access management device is further configured to generate a matrix representing the relationships in the input.

10. The system of claim 8, wherein the access management device is configured to run the access test by retrieving a mapping file associated with the input, and wherein the mapping file specifies which of the one or more computing systems are to be tested.

11. The system of claim 8, wherein the input includes one or more tags that respectively identify any action or user role to be modified.

12. The system of claim 11, wherein the access management device is further configured to remove the one or more tags prior to providing the input to the control server.

13. A non-transitory computer-readable medium in which computer-executable code is stored, the computer-executable code configured to cause a computing device in which the computer-readable storage medium is loaded to execute steps of:

providing, by an access management device, an input including relationships between computing system actions and associated user roles to a control server for implementation of access rules in accordance with the relationships;

upon implementation of the access rules, running an access test to determine any access discrepancy between an attempted access and the relationships in the input, wherein determining any access discrepancy comprises dynamically creating respective test users for each of the user roles to be tested based upon database information and identifying any inconsistencies between test user accessibility of the computing system actions and the relationships in the input via an administrative tool of the control server; and presenting in a test report any access discrepancy between the attempted access and the relationships in the input.

14. The non-transitory computer-readable medium of claim 13, further comprising computer-executable code configured to cause the computing device to execute a further step of generating a matrix representing the relationships in the input.

15. The non-transitory computer-readable medium of claim 13, wherein running the access test comprises retrieving a mapping file associated with the input, and wherein the mapping file specifies which of one or more computing systems are to be tested.

16. The non-transitory computer-readable medium of claim 13, wherein the input includes one or more tags that respectively identify any computing system action or user role to be modified.

17. The non-transitory computer-readable medium of claim 16, wherein the one or more tags are removed from the input prior to providing the input to the control server.

* * * * *